United States Patent [19]
Bokaie et al.

[11] Patent Number: 5,771,742
[45] Date of Patent: Jun. 30, 1998

[54] RELEASE DEVICE FOR RETAINING PIN

[75] Inventors: Michael D. Bokaie, Fremont; John D. Busch, San Jose; A. David Johnson, San Leandro; Bruce Petty, Dunsmuir, all of Calif.

[73] Assignee: TiNi Alloy Company, San Leandro, Calif.

[21] Appl. No.: 526,715

[22] Filed: Sep. 11, 1995

[51] Int. Cl.$^6$ ................................................ B25G 3/18
[52] U.S. Cl. ........................... 74/2; 337/140; 403/28; 403/32
[58] Field of Search ........................... 74/2; 337/140; 403/28, 326, 328; 251/68, 129.06; 137/76; 292/170, 252

[56] References Cited

U.S. PATENT DOCUMENTS

| | | | |
|---|---|---|---|
| 4,524,343 | 6/1985 | Morgan et al. | 337/140 |
| 5,119,555 | 6/1992 | Johnson | 403/28 X |
| 5,129,753 | 7/1992 | Wesley et al. | 403/328 X |
| 5,192,147 | 3/1993 | McCloskey | 403/322 |
| 5,312,152 | 5/1994 | Woebkenberg, Jr. et al. | 294/86.4 |
| 5,364,046 | 11/1994 | Dobbs et al. | 292/252 |

OTHER PUBLICATIONS

Product flyer, SW–2525 "Resettable Pin Puller", Starsys Research; prior to Jan. 1994.
Product flyer, model 1736 "Pin Puller", Quantic Industries, Inc.; prior to Jan. 1994.
Product flyer, model 8003 "Pin Puller", G&H Technology, Inc.; prior to Jan. 1994.

*Primary Examiner*—Rodney H. Bonck
*Assistant Examiner*—Troy Grabow
*Attorney, Agent, or Firm*—Flehr Hohbach Test Albritton & Herbert LLP

[57] ABSTRACT

A release mechanism employing an actuating element of a shape memory alloy material. When the actuating element is heated through its phase-change transition temperature it applies a force which moves a latch to a position which activates the higher energy stored in a drive spring for moving a retaining element out of engagement with a structure. A detent when in a captured position releasably holds the retaining element in its locked position, and the detent is moved from a captured position to a retracted position to release the retaining element when the latch is moved by the actuating element.

10 Claims, 6 Drawing Sheets

FIG_1

FIG_2

FIG_3

FIG_7

FIG_5

FIG_4

FIG_6

FIG_8

RELEASE DEVICE FOR RETAINING PIN

This invention was developed under National Aeronautics Space Administration contract #NAS3-26834.

BACKGROUND OF THE INVENTION

1. Field of the Invention

This invention relates in general to release devices such as pin pullers for remotely releasing pins or other retaining elements from engagement with different types of structures, for example in space vehicles, oceanographic equipment and the like.

2. Description of the Related Art

A number of different types of release devices have heretofore been provided in the prior art for separating components of apparatus or structure. Applications of such release devices include the deployment of payloads from space vehicles, the safing and arming of ordnance, the release of emergency hatches, and the recovery of instrument packages from oceanographic equipment or from torpedoes used in target practice.

The prior art release devices include cartridge actuated pyrotechnic devices which include separation nuts, explosive bolts, bolt cutters and pin pullers.

Burn-wire devices have also been provided which include tensile release elements and spring loaded pin pullers. Paraffin actuated devices have also been used and are primarily limited to pin pullers.

The use of pyrotechnic release devices produces extremely large forces in a very short period of time, and enables a large load release in a matter of milliseconds. Pyrotechnic devices are, however, inherently dangerous to manufacture and install, are suitable only for one-time use, and are subject to inadvertent ignition. The pyro shock which these devices produce and the firing system weight impose significant constraints on design of the surrounding structure.

Burn-wire devices, which operate on the basis of fusing a mechanical loadbearing element, known as a non-explosive initiator (NEI), must be reloaded with a newly wound initiator after each firing. Once the mechanical element fuses, the restraining wire must freely uncoil a number of turns in order to effect proper release. In addition, the NEI operated mechanisms are limited to relatively small loads.

High output paraffin (HOP) actuators can be cycled numerous times with reliable performance, but are large, complex, expensive and slow to operate. Another disadvantage is that the paraffin, should it be inadvertently released, represents an undesirable highly outgassing material in vacuum application.

The need has been recognized for a release device which obviates the foregoing and other limitations and disadvantages of prior art release devices. Despite the various release devices in the prior, there has heretofore not been provided a suitable and attractive solution to these problems.

OBJECTS AND SUMMARY OF THE INVENTION

It is a general object of the present invention to provide a new and improved release device for disengaging a pin or other retaining element from a structure.

Another object is to provide a release device of the type described which is simple in design and compact in size.

Another object is to provide a release device of the type described which employs a small force for triggering a relative much larger force for releasing a pin or other retaining element.

Another object is to provide a release device of the type described which employs a shape memory alloy actuating element which recovers when heated to produce a release latch stroke which is a multiple of the actuating element displacement stroke.

Another object is to provide a release device of the type described in which the operating force is produced by recovery of a shape memory alloy material such that the device is non-corrosive, non-outgassing, capable of millions of cycles, which can be actuated rapidly by being heated with direct electric current, and which can be remotely actuated.

Another object is to provide a release of the type described which is reliable in operation by being triggered through a simple heat source, such as joule heating or radiation from a heat source.

Another object is to provide a release device of the type described which, following actuation, can be easily reset for another cycle of operation.

Another object is to provide a release device of the type described which has a relatively short trigger time on the order of 100ths of a second.

The invention in summary provides a release device comprised of a housing which guides a retaining element for movement into locked and released positions at which the retaining element is respectively engaged with and disengaged from the structure. A retractable detent is mounted for holding the retaining element in its locked position, and the detent is moved to a retracted position in which a main drive force is enabled for urging the retaining element toward its released position. The detent is operated by a latch which is moved between armed and triggered positions by an actuating element which is comprised of a shape memory alloy material. The actuating element is connected for moving the latch toward its triggered position responsive to recovery of the actuating element to its memory shape when heated through a phase-change transition temperature of the material. Certain embodiments provide arrangements for multiplying the stroke of the latch in relation to the recovery stroke of the actuating element.

The foregoing and additional objects and features of the invention will appear from the following specification in which the preferred embodiments have been set forth in detail in conjunction with the accompanying drawings.

DESCRIPTION OF THE PREFERRED EMBODIMENTS

Figure 1:
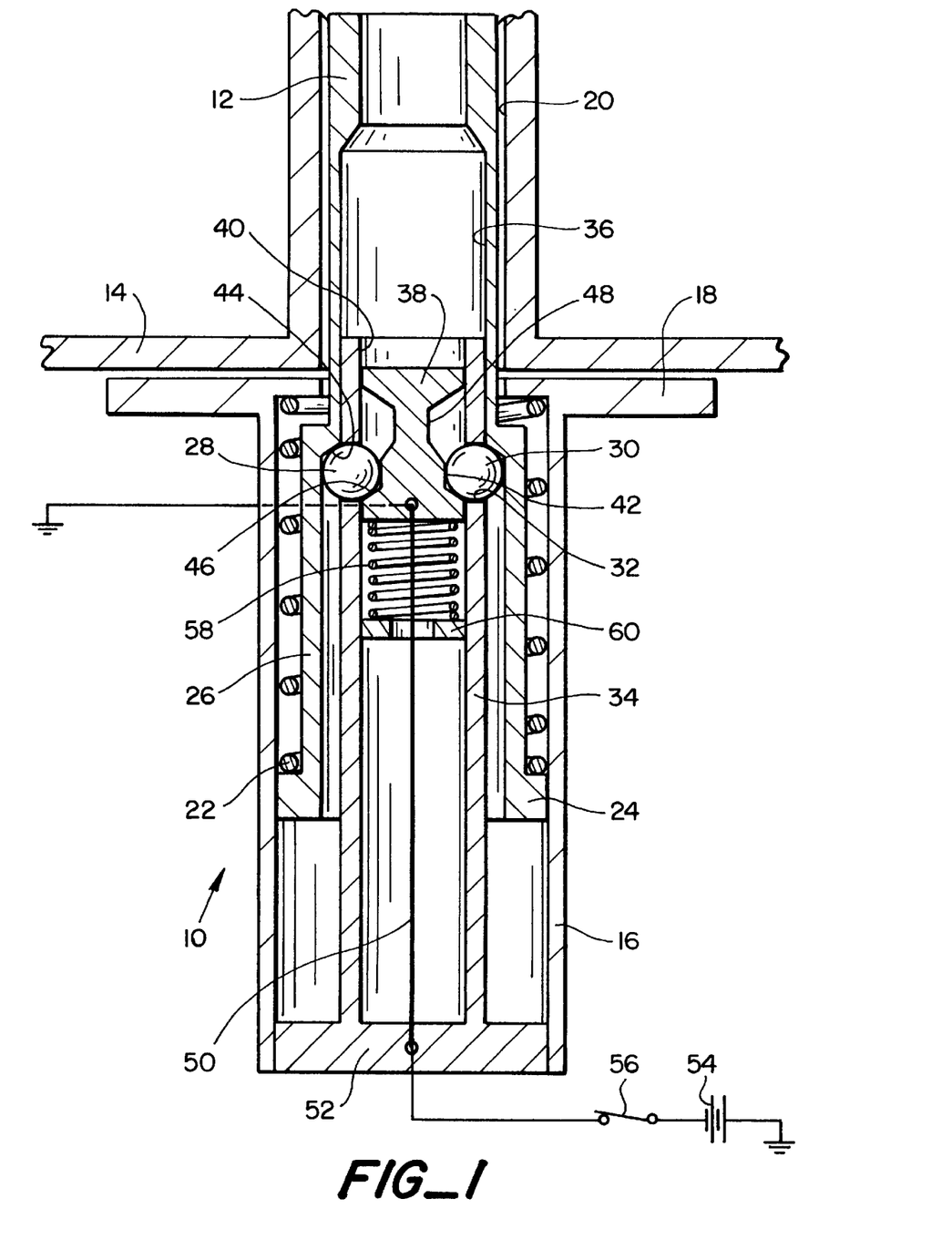
FIG. 1 is an axial section view of a release device in accordance with one preferred embodiment of the invention.

In the drawings FIG. 1 illustrates generally at 10 a release device for disengaging a retaining element 12, shown as a pin, from the pin's associated structure 14. The invention contemplates that the retaining element could be any desired pin, bolt, key, rod or the like and that the associated structure could be a space vehicle payload, ordnance device, emergency hatch, instrument package of oceanographic equipment or the like. The retaining element could also be a gate valve or diaphragm or other mechanical element which is moved to release a fluid or gas contained under high pressure within a tank or chamber. One example could be storage of a fluid under high pressure where the outlet is kept shut by a mechanical element which is released by a low force.

Retaining element 12 is mounted for axial movement within a housing 16. The housing is provided with flanges 18 for attachment by suitable fasteners or other means to an associated structure, not shown, such as the spacecraft frame. In FIG. 1 retaining element 12 is shown extended outwardly to its locked position where it is seated in engaged relationship with the bore 20 of the structure 14 which is to be released.

The retaining element is retracted out of engagement with structure 14 to a released position downwardly as viewed in FIG. 1 by a main drive force provided by drive spring 22. In the locked position of the retaining element the drive spring is held under compressive force by an annular rim 24 formed about the lower end of a collar 26 which is integral with and extends downwardly from the retaining element.

Retractable detent means is provided for releasably holding the retaining element in its locked position and for enabling the retaining element to move toward its released position. The retractable detent means comprises one or more, and preferably two, balls 28, 30 which are mounted for movement between captured positions, as shown in FIG. 1, and retracted positions at which they lie radially inwardly of the captured positions. In the captured positions the balls loosely fit within openings 32 formed in the sides of a tubular ball keeper 34. The ball keeper extends axially through the housing and slidably fits at its distal end within a bore 36 formed within the retaining element.

A spool-shaped latch 38 is slidably fitted within an axial bore 40 of the ball keeper. The latch slides within the bore between an armed position, as shown at FIG. 1, and a triggered position, which is in a downward direction from that shown. In the armed position a reduced diameter annular portion 42 of the latch fits against the inner sides of the balls to hold them in their captured positions. The outer sides of the ball detents form stops which register with an annular beveled cam surface 44 formed on the inside of collar 26 to prevent downward movement of the retaining element.

The relatively large force of drive spring 22 produces a force component which acts at an angle inwardly and downwardly from the cam surface 44 against the balls. This force component is balanced by a combination of the resisting force applied upwardly by the ball keeper and by the force applied upwardly and outwardly by an annular beveled cam surface 46 on the latch when the latter is in its locked position. When the latch is moved downwardly to its triggered position, the resisting force from cam surface 46 is released so that the force component from the drive spring applied by outer cam surface 44 is effective to push the balls inwardly into an annular recess 48 in the latch. This recess is moved into register with the balls as the latch is moved downwardly toward its triggered position. The balls are in their retracted positions when seated in the annular recess. In this position the balls are out of register with outer cam surface 44, thereby enabling the drive spring to move the retaining element downwardly and out of engagement with structure 14.

The latch is moved downwardly to its triggered position by an actuating element 50. In this embodiment the actuating element is comprised of an elongate wire of shape memory alloy material (also termed SMA). The SMA preferably is TiNi (Nitinol), an alloy of nearly equal atomic amounts of Titanium and Nickel. Other suitable shape memory materials include CuAlNi and TiNiPd alloys. The shape memory materials are characterized in being easily deformed when cold (i.e. at a temperature below the material's phase-change transition temperature) and which produce large stresses, with shape recovery of about 3%, when heated through the phase-change transition temperature. As used herein, the phrase "heated through the phase-change transition temperature" includes both the case of heating the actuating element to within the relatively narrow range of temperature at which phase change occurs and the case of heating above that range. The upper end of the SMA wire is attached by suitable means to the latch, and the lower end is attached to an end plug 52 that is fitted within the lower end of the housing and which mounts the bail keeper.

Heating of the SMA wire through its phase-change transition temperature causes it to recover from a low temperature shape toward a memory shape. In this embodiment, recovery toward the memory shape is by contraction of the wire which causes the latch to move downwardly through its stroke distance to the triggered position. The wire is preferably heated by the $I^2R$ effect of an electric current supplied by a suitable power source, shown schematically as a battery 54 and on-off switch 56. With the circuit open the wire is cooled, for example by convection to ambient atmosphere, to below the transition temperature. After retaining element 12 is returned upwardly by suitable means to its locked position the wire is plastically deformed by being stretched back to its low temperature shape through the action of reset means which comprises a coil spring 58. The reset spring applies an upward compressive force against the latch. Spring 58 encircles the upper end of the SMA wire and is seated at its lower end against a ring 60 which is secured within the ball keeper.

Reset spring 58 is effective to simultaneously stretch the SMA wire back to its low temperature shape while pushing the latch upwardly to its armed position. In the locked position the enlarged diameter portion of the collar comes into register with the balls. The balls are then free to be pushed radially outward into the holes of the ball keeper due to the force applied by the frusto-conical surface of latch recess 48 as it is pushed upwardly by the reset spring.

In the embodiment of FIG. 1 the SMA wire 50 provides a predetermined work output limit which is based on its volume size. The work output is defined as the actuator force times the recovery stroke of the wire. The amount of force expected from the SMA wire can be calculated based on its maximum allowable stress, which is approximately 30,000 lbs/sq-in. The available stroke is a function of actuator length so that the stroke due to deformation by contraction is approximately 3% of that length. One example is an SMA wire of approximately 0.003" in diameter and 2.0" in length. Using the above work output estimates, this volume of wire is capable of only 0.21 lb force and 0.060" stroke, yielding 0.0126 ft-lbs of work. This size of SMA wire can be used in the embodiment of FIG. 1 for triggering the release of stored energy from a drive spring of a size which can provide 2.5 ft-lbs work output. Such a work output is nearly 200 times the output of the SMA wire.

Release device 10 of FIG. 1 is relatively small in size, easy to use and reset, exhibits a near immediate response, and consumes relatively low power. Disengagement of the retaining element can be achieved in less than 0.1 second with as little as 6 volts from a power supply. This makes the release device well suited for applications requiring multiple release points. A further advantage is that the retraction force and stroke can be readily adjusted by changing main drive spring 22 to the desired stroke and compression force without the requirement of changing the SMA wire. The energy stored in the drive spring is vectorially divided between ball keeper 34 and movable latch 38. As a result, the latch experiences only a fraction of the total force generated by the drive spring. The component of this force is further reduced by the geometry of the latch profile so that substantially the only forces required for the SMA wire to overcome for movement to its triggered position are the relatively low frictional forces at the points of contact between the balls and latch.

Release device 10 is easy to reset merely by applying, either manually or by other means, sufficient counterforce against retaining element 12 to compress the main drive spring sufficient to move collar 26 back up to the position shown in FIG. 1. The retractable detents and latch are then automatically reset by the action of reset spring 58. This arrangement makes the embodiment of FIG. 1 suitable for a one-time high energy release, such as for release of a spacecraft payload. The device can later be reset as needed when the spacecraft is brought back to earth. The reset feature also makes it simple and easy to test the device.

Figure 2:
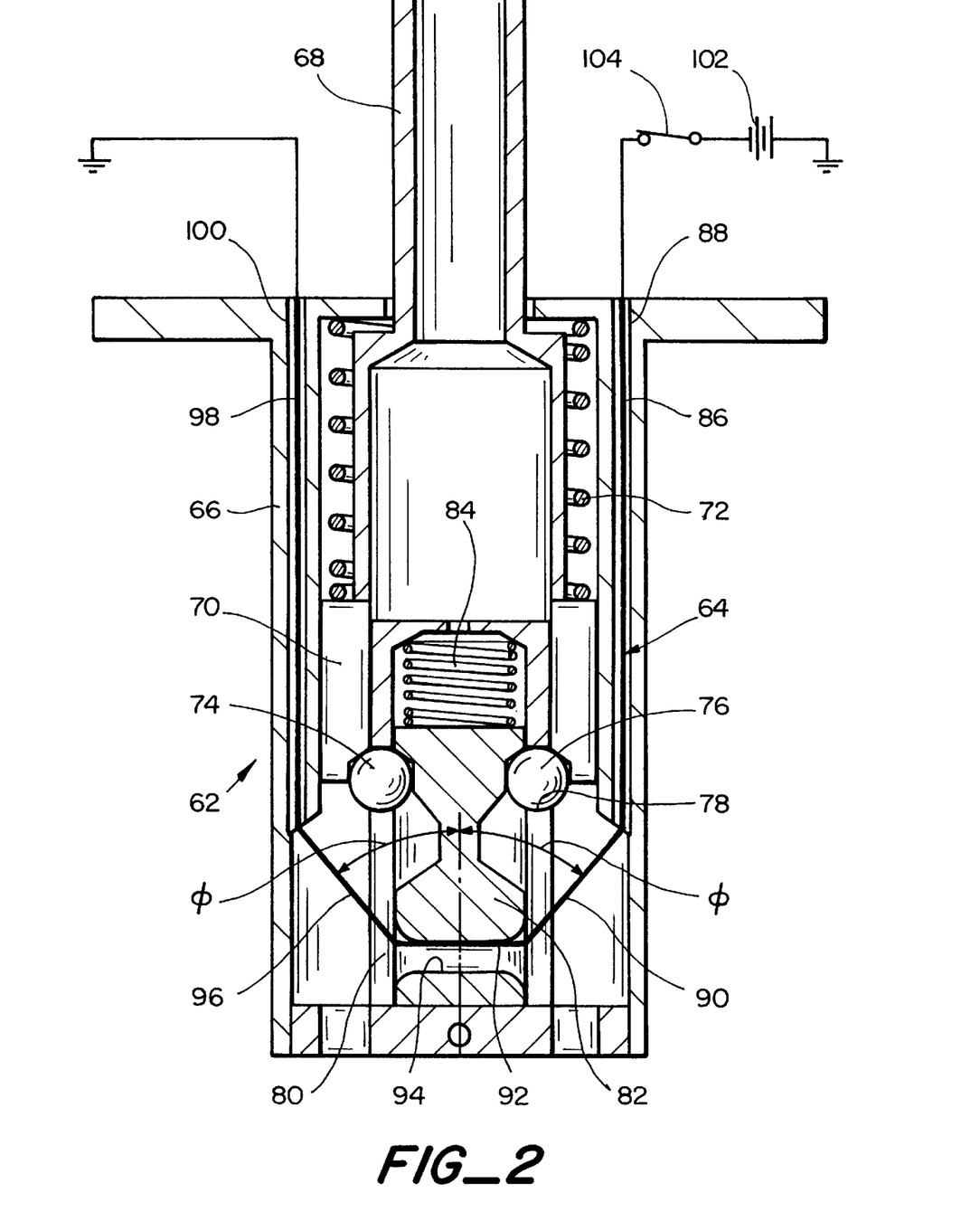
FIG. 2 is an axial section view of a release device according to another preferred embodiment.
Figure 3:
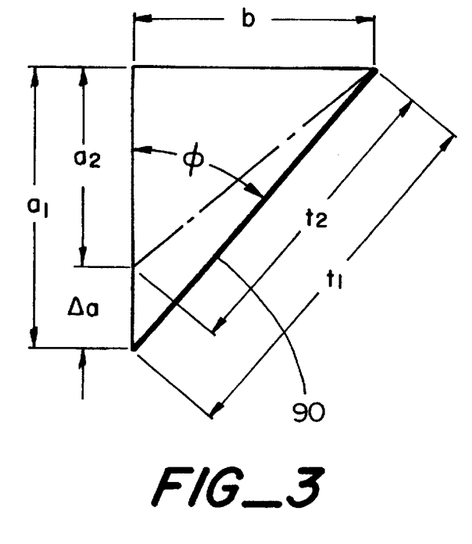
FIG. 3 is a schematic diagram illustrating operation of the stroke multiplication features in the release device of FIG. 2.

FIGS. 2–3 illustrate an embodiment providing a release device 62 which creates multiplication of the latch stroke displacement in comparison to the stroke of the SMA actuating element 64. This enables the release device to be used in relatively confined spaces as compared to the embodiment of FIG. 1 where the latch stroke is equal to the actuating element stroke. Because the SMA material deforms only about 3%, then in the arrangement of FIG. 1 the length of the SMA wire must be made relatively long to provide the stroke required to generate sufficient movement to release the latch. In comparison to an SMA spring actuator, the SMA wire actuator is more desirable due to its greater simplicity, higher availability, and greater work output potential. The force multiplication arrangement of the embodiment of FIG. 2 utilizes the high work output potential of the wire element in tension while minimizing the effect of the relatively small 3% strain when the wire contracts to its memory shape.

Release device 62 comprises a housing 66 which mounts a retaining element 68 or pin for longitudinal movement relative to the desired structure, not shown, with which the pin is engaged. A collar 70 carried on the lower end of the retaining element mounts a high force main drive spring 72 which is under compression when the retaining element is in the locked position illustrated in FIG. 2.

A retractable detent mechanism comprising a pair of balls 74, 76 which are held within openings 78 in the sides of a ball keeper 80 is provided. The detent could also comprise four or more balls. A spool-shaped latch 82 is mounted for movement within a cylindrical cavity within the ball keeper from the armed position shown in FIG. 2 upwardly to a triggered position. With the latch in its armed position the balls are in register with the path of movement of collar 70 so that the retaining element is held in its locked position. Reset means comprising a coil spring 84 is mounted between the upper end of the ball keeper and the latch. The coil spring yieldably urges the latch downwardly toward its triggered position.

The actuating element 64 for triggering the latch comprises a length of SMA wire which is trained in a path which causes the stroke distance of the latch to be a predetermined multiple of the contraction stroke of the wire. The path is defined by a head portion 86 at one end of the wire which is connected at its proximal end to the upper end of the housing. This portion of the wire runs longitudinally downwardly through a bore 88 formed in the housing. This head portion is coupled in end-to-end relationship with a tail portion 90 which extends downwardly and inwardly at an acute angle φ with respect to the path of movement of the latch, which is parallel to the longitudinal axis of the housing. The lower end of tail portion is coupled end-to-end with a transverse portion 92 which extends through a slot 94 formed in the lower end of the latch. Transverse portion 92 is coupled end-to-end with a second tail portion 96 on the opposite side, and this tail portion extends upwardly and outwardly at an acute angle, which advantageously can be the same angle φ. The upper end of tail portion is coupled end-to-end with a second head portion 98 which extends upwardly through a longitudinal bore 100 on the opposite side of the housing. The proximal end of head portion 98 is secured to the upper end of the housing.

In the illustrated embodiment the head, tail and transverse portions of the SMA wire form a continuous loop which extends around the lower end of the latch. This enables a single path flow of electrical current for heating the wire through its phase-change transformation temperature. Electrical resistance heating is applied by power means which is shown schematically as a battery 102 and on-off switch 104 connected in series to head portion 86, with the opposite head portion 98 being connected to ground. In place of a continuous loop arrangement, the head and tail portions on opposite sides of the latch could be separate wires with their tail ends interconnected by a suitable electrical conductor, not shown.

Release device 62 is actuated by closing switch 104 to begin resistance heating of the SMA wire. When heated through its phase-change transition temperature the entire length of the wire, including the head, tail and transverse portions, recover by contraction to their memory shape through a stroke distance which is approximately 3% of the wire's overall length. The V-shaped profile which each tail portion makes with an imaginary line running lengthwise of the latch and through the point of coupling with transverse portion 92 can be viewed as a right triangle on each side, as shown in the schematic of FIG. 3. In the low temperature shape of the SMA, wire tail portion 90 has the hypotenuse length $t_1$ shown in FIG. 3. The triangle leg $a_1$ represents the distance lengthwise of the latch from the lower end of the tail portion to an imaginary line passing transversely through the upper end of the tail portion, and b represents the other leg of the right triangle. When the SMA wire contracts to its memory shape, the 3% strain causes the latch to move upwardly through the stroke distance Δa to form a new right triangle having the hypotenuse $t_2$ and the opposite legs b and $a_2$. Because the transverse dimension b is constant as the hypotenuse reduces in length, the Pythagorean theorem dictates that the change in vertical dimension is greater than the change in the hypotenuse length t. Thus, $\Delta a = \sqrt{t_1^2 - b^2} - \sqrt{t_2^2 - b^2}$. The trade off for this stroke multiplication is a reduction in the amount of force that the SMA wire can apply upwardly on the latch. This is because the force upwardly on the latch is a component of the total force of the wire and a function of the angle $\phi$. The smaller the angle $\phi$ then the more vertical the tail component t becomes and the closer it will approximate a straight wire with respect to upward force and latch stroke. In the invention, optimum results are obtained with the acute angle $\phi$ in the range of 10° to 65°, and preferably within 15° to 60°.

The following example illustrates the effect of stroke multiplication where the total length of the SMA wire, including the head, tail and transverse portions, is 1.7" so that the overall wire length on each side is 0.85". With the SMA wire tail portion extending at an acute angle $\phi$=42.8°, its hypotenuse length $t_1$=0.191", the horizontal leg b=0.141" and the vertical leg $a_1$=0.130". Based on a 3% strain recovery of the SMA wire throughout its entire length, the contraction stroke is CS=0.03×0.85"=0.0255". This contraction stroke is effectively concentrated in the hypotenuse of the right triangle so that, following actuation, $t_2$=0.191"–0.0255"=0.166". Using the Pythagorean formula, the vertical leg of the triangle following actuation is $a_2$= $\sqrt{0.166^2+0.141^2}$=0.088". The effective stroke therefore is $\Delta a$=0.130"–0.088"=0.0422". In other words, for a SMA wire contraction stroke of 0.025" the effective latch stroke is 0.042", which is a multiplication ratio of 1.65.

It is an important characteristic of the stroke multiplication feature of the embodiment of FIG. 2 that the multiplication ratio can be varied by changing either or both the acute angle $\phi$ or the length of the SMA head portions. Lengthening or shortening the head portions respectively increases or decreases the stroke multiplication because the 3% strain recovery from the entire length of the wire is effectively concentrated in the angled tail portions for applying the upward force against the latch. For example, assuming that the lengths of the tail portions remain constant, the longer the length of the head portions then the greater is $\Delta a$ to produce a greater latch stroke.

Another feature of the embodiment of FIG. 2 is that, when the SMA wire undergoes contraction and begins to pull the latch upwardly, the angle $\phi$ becomes greater and the magnitude of the upward force applied on the latch by the wire falls off so that near the end of the stroke there is less applied force. In certain applications this can be an advantage because during the initial portion of the stroke the friction to be overcome can be greater, and after the latch begins its movement less force is required to carry the latch through its stroke.

Figure 4:
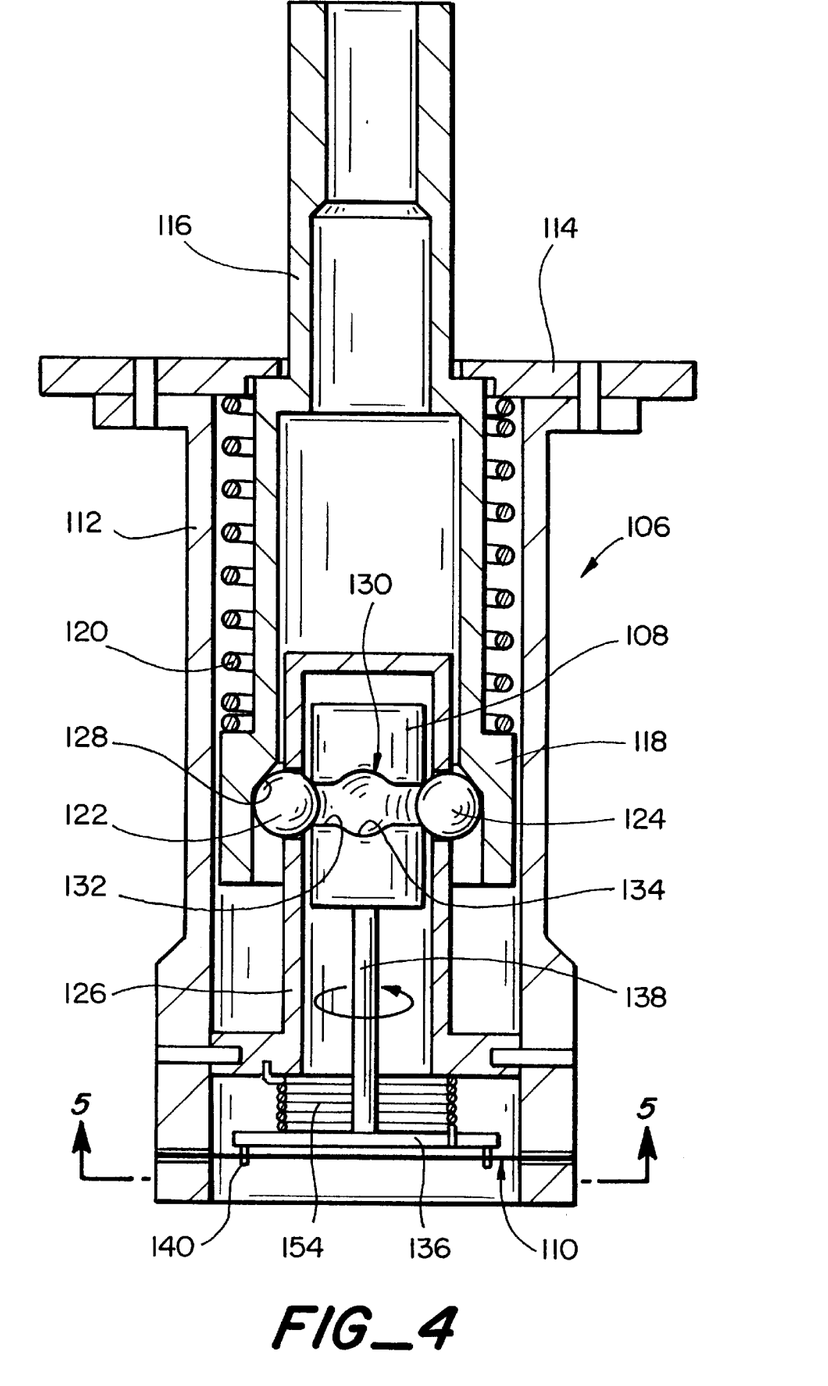
FIG. 4 is an axial section view of a release device according to a further preferred embodiment.
Figure 5:
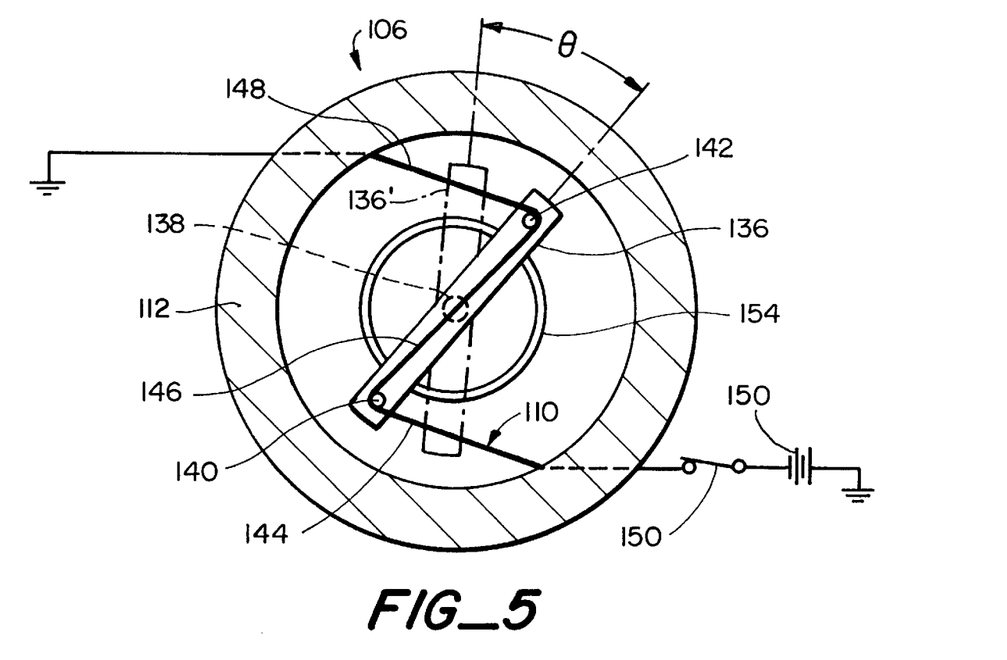
FIG. 5 is a cross sectional view to an enlarged scale taken along the line 5—5 of FIG. 4.

The embodiment of FIGS. 4–5 provides a release device 106 incorporating a rotary latch 108 which is operated by an SMA actuating element 110 in an arrangement providing stroke multiplication. Release device 106 is comprised of a housing 112 mounted at its upper end to supporting structure 114. The structure 114 is formed with an opening which slidably receives a retaining element 116 or pin which engages an associated structure, not shown, that is to be released. A collar 118 at the lower end of the retaining element is mounted for axial movement within the housing from the locked position illustrated in FIG. 4 downwardly to a released position by means of a main drive spring 120. In the locked position the retaining element is held by a retractable detent comprising a pair of balls 122, 124 which loosely fit within openings formed at opposite sides of a cylindrical ball keeper 126. An annular beveled cam surface 128 formed on the inside of the collar directs a component of the drive force from spring 120 downwardly and inwardly against the balls when they rest in the captured position shown in FIG. 4.

Latch 108 comprises a cylinder mounted for rotation about the longitudinal axis of the housing within the ball keeper. An annular groove extends about the periphery of the latch to provide a detent track 130. The detent track has a first track portion 132 comprising radially opposite sectors of the groove which are narrower in width than the ball diameters. When the latch is rotated to the armed position shown in FIG. 4 these narrow track portions are brought into register with the ball keeper holes to prevent the detent balls from moving inwardly from the captured positions. The detent track is also formed, at 90° positions from the narrow track portions, with a pair of diametrically opposed wider track portions 134. When the latch is rotated from the armed position 90° to the triggered position, the wide track portions are brought into register with the balls. This enables the component of force applied from cam surface 128 to move the balls inward so that they seat in the wide portions of the track where the balls are in their retracted positions. This enables drive spring 120 to forcefully push the retaining element down to its released position.

Rotary latch 108 is operated by actuating element 110 which is comprised of a length of SMA wire. Connecting means is provided for applying a drive torque to rotate the latch to its triggered position responsive to recovery of the SMA wire toward its memory shape when the wire is heated through its phase-change transition temperature. The connecting means comprises a lever arm 136 which is mounted orthogonal to and for rotation with a stem 138 that extends downwardly from the latch.

As shown in FIG. 5, the SMA wire is reeved in a Z-shaped pattern around a pair of downwardly extending pins 140, 142 formed on the ends of the lever bar. Opposite ends of the wire are fixedly attached to radially opposite sides of the housing. A first leg 144 of the wire extends toward pin 140 where it is reeved around the pin's outer side and continues along a second leg 146 toward the opposite pin 142. The third leg 148 is reeved around the outer side of pin 142.

An electrical power source is provided for heating the SMA wire and is shown schematically as the battery 150 and on-off switch 152 connected in series with one end of the wire, and with the other end of the wire connected to ground. When the circuit is closed and the wire heated through its phase-change transition temperature, the 3% recovery of the wire towards its memory shape causes the wire's first and second legs to exert pulling forces on the respective pins. These forces act through moment arms and produce a torque for rotating the lever arm to the position shown in broken line at 136' in FIG. 5. The lever arm simultaneously rotates the latch to its triggered position for retracting the detent and disengaging the retaining element. The arc of rotation of the lever for rotating the latch and the arm to the triggered positions is through the angle $\theta$, which also constitutes the latch's stroke displacement. The force generated by each end of the SMA wire is applied to the latch along a moment arm distance which is predetermined according to the radii of the pins from that axis.

The magnitude of the stroke arc is in accordance with the equation $\theta = 2 \arcsin\left(\frac{S/2}{R}\right)$ where S is the stroke of SMA wire recovery, R is the radius of the moment arm through which the SMA force acts and $\theta$ is the angular displacement of the lever arm. An example of the stroke multiplication in release device 106 of the embodiment of FIGS. 4 and 5 is as follows:

Overall SMA wire length=2.0"
Pin-to-pin length of lever arm 0.40"
Radius of moment arm R=0.20"
Based on a 3% strain recovery during contraction of the SMA wire to its memory shape, the overall contraction stroke S=0.060". With the Z-shaped geometry of the SMA wire, then the calculated angle of rotation θ of the lever arm and latch is $$\theta = 2 \arcsin\left(\frac{0.060/2}{0.20}\right)$$

or θ~17.2°. In another example, using the same 2.0" wire length but with a radius arm R reduced to 0.10, then θ~34.4°.

Means is provided for applying a reset force for returning the latch to its armed position and comprises a coil reset spring 154 mounted coaxially about the latch stem. One end of the reset spring is attached to lever arm 136 and the other end is attached to a side of ball keeper 126. Rotation of the lever arm when the SMA contracts automatically tightens the reset spring to store elastic energy. Switch 152 can then be opened to shut off current flow through the wire, which then cools below its phase-change transition temperature. The ball detents and latch will remain in their respective retracted and triggered positions as long as retaining element 116 remains in its released position. Reset is accomplished by pulling the retaining element by suitable means outwardly to its locked position. Reset spring 150 then is free to release its energy and rotate lever arm 136 counterclockwise as viewed in FIG. 5. This rotation plastically deforms the SMA wire by stretching it back to its low temperature shape. This action of the lever arm also rotates latch 108 back to its armed position, with the detent track 130 pushing the balls outwardly so that the narrow track portions hold the balls in the captured position which in turn holds the retaining element in its locked position.

The means for connecting the SMA wire with the lever arm enables a stroke multiplication effect in which the rotary movement or stroke of the latch is a multiple of the linear contraction distance of the SMA wire. Because the degree of angular rotation of the lever is a function of the radii of the pin locations, then the multiplication ratio can be increased or decreased by locating the pins respectively closer to or further from the axis of rotation. Release device 106 of this embodiment can thereby produce a relatively large degree of rotary motion of the latch in a compact space because a relatively long SMA wire can be folded into the Z-shaped configuration shown in FIG. 5. Other suitable folded wire configurations could be provided to fit within the cylindrical wall of the housing and which apply force moments to the lever arm in the manner described. The relatively small 3% contraction stroke of the SMA wire generates a relatively large rotation motion for returning the latch to its armed position.

Figure 6:
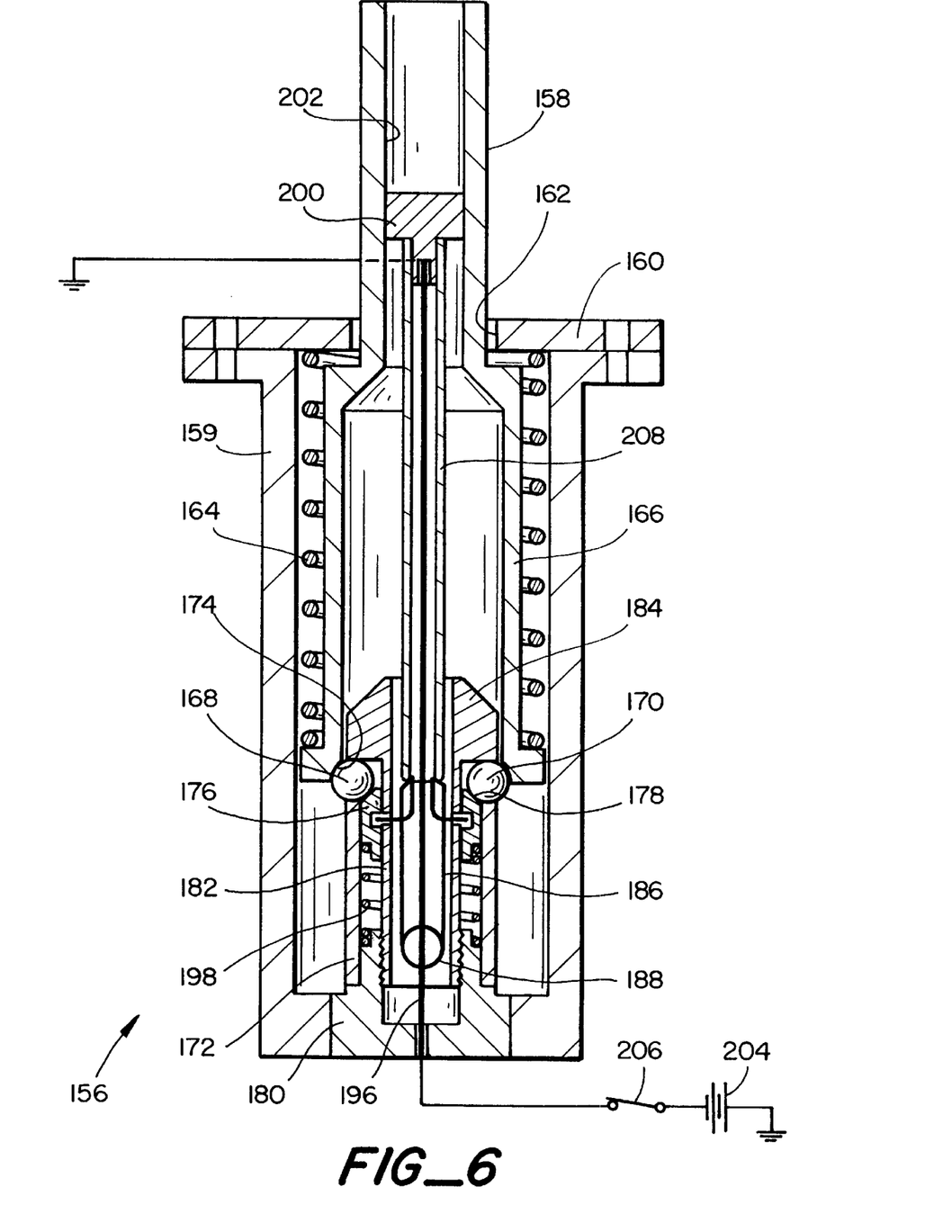
FIG. 6 is an axial section view of a release device according to a further preferred embodiment.

FIG. 6 illustrates another embodiment providing a release device 156 which is specially adapted for use in apparatus which are subject to excessive vibration, shock and other forces which could otherwise accidentally trigger release of the retaining element or pin 158. Release device 156 is comprised of a cylindrical housing 159 mounted at one end to the associated structure 160, for example the frame of a spacecraft. The retaining element 158 is mounted within the housing so that its upper end penetrates through an opening 162 in structure 160 for releasable engagement with another structure, not shown, such as the payload which is to be released. A main drive spring 164 mounted within the housing pushes against the end of a collar 166 carried on the lower end of the retaining element. The drive spring stores a relatively large energy source for moving the retaining element from the locked position shown in FIG. 6 downwardly to a released position.

A retractable detent is provided for releasably holding the retaining element in its locked position. The retractable detent comprises a pair of balls 168, 170 which loosely fit within openings formed at opposite sides of a ball keeper 172. The detent could also comprise four or more balls. An annular cam surface 174 formed at the lower end of the collar applies a component of the force from the drive spring in an angular direction downwardly and inwardly against the balls. The balls are retained in the captured position shown in FIG. 6 by means of an annular latch 176 which is mounted for movement lengthwise of the housing within the ball keeper. An annular beveled surface 178 formed at the upper end of the latch acts against the balls to oppose the component of force which pushes down and in from the collar.

The lower end of the housing is provided with an end plug 180 which threadably mounts a tubular support 182 that extends axially through the center of the latch. The latch is adapted to slide along the gap between support 182 and ball keeper 172 from the armed position shown in FIG. 6 downwardly to a triggered position at which the balls are enabled to be pushed inwardly by the collar. Support 182 is formed at its upper end with an enlarged head 184 having a lower annular rim which provides space for retaining the balls in their retracted positions.

Figure 7:
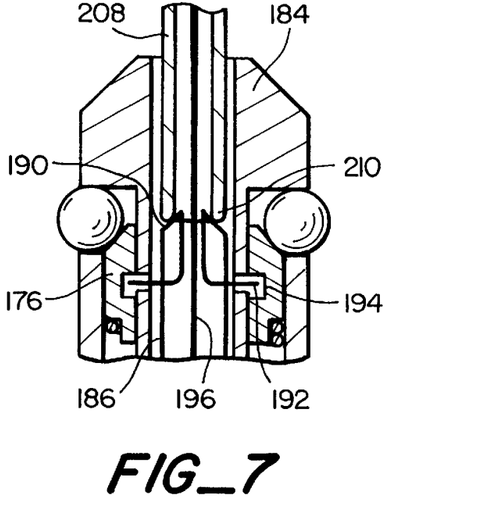
FIG. 7 is a fragmentary view to an enlarged scale showing details of the tapered ear and tip on one side of the spring element in the device of FIG. 6.

Latch 176 is releasably held in its armed position by a spring element 186, which preferably is formed of a suitable spring metal. Spring element 186 is comprised of a length of wire which is bent at its mid portion into a plurality of coil turns 188. Opposite ends of the wires extend upwardly through a distance where they are bent back to form tapered ears 190 and 15 then bent out to form radially extending tips 192 (FIG. 7). The tips slidably fit into a pair of notches 194 formed in the inner cylindrical wall of the latch. The "memory" shape of spring element 186 is that shown in FIG. 6 with the tips engaging the notches to releasably hold the latch in its armed position.

Actuating element 196 comprised of an elongate SMA wire is provided for triggering spring element 186 to release the latch. When released, the downwardly and inwardly directed force component from collar surface 174 acts on the balls which in turn press against the upper cam surface 178 on the latch. This pushes the latch downwardly toward its triggered position. A reset spring 198 which is mounted in the annular space between the ball keeper and support 182 is compressed as the latch moves downwardly.

The SMA wire is mounted at its lower end to housing end plug 180 and at its upper end to a tube guide 200 which is mounted for axial sliding movement in a bore 202 formed through the centerline of the retaining element.

The SMA wire is heated through its phase-change transition temperature by a suitable power source, shown schematically as a battery 204 and on-off switch 206. Trigger means is provided for triggering the spring element responsive to contraction of the SMA wire. The trigger means comprises a tube 208 encircling the wire and which is mounted at its upper end for movement with tube guide 200. The lower end 210 of the tube presses against the downwardly and outwardly inclined tapered ears. Downward movement of the tube caused by contraction of the SMA wire causes the tube end to cam the tapered ears inwardly. This in turn causes the tips 192 to retract from the notches, thereby enabling the latch to be moved downwardly toward its triggered position.

When the electric circuit is opened the SMA wire is permitted to cool to below its transition temperature.

Release device 156 can then be reset by pulling, either manually or by other means, the retaining element back to its locked position. The balls are thereby enabled to be moved outwardly to their captured positions by the action of the latch being pushed upwardly by the force of the return spring 198. This carries the latch notches into register with the spring element tips. The spring element's elastic memory causes it to return to the shape shown in FIG. 7 so that the tips re-engage with the notches. The force of the elastic memory is also sufficient to cause the tapered ears, as they move radially outwardly, to cam against the lower end of the tube. This camming action causes the tube and tube guide to move upwardly, which elastically stretches the SMA wire back to its low temperature shape.

In the release device of FIG. 6 the spring force is effective to positively hold spring tips 192 firmly seated into the notches of the latch even when substantial vibration, shock and other forces may be encountered that could otherwise move the latch and unintentionally retract the ball detents.

Figure 8:
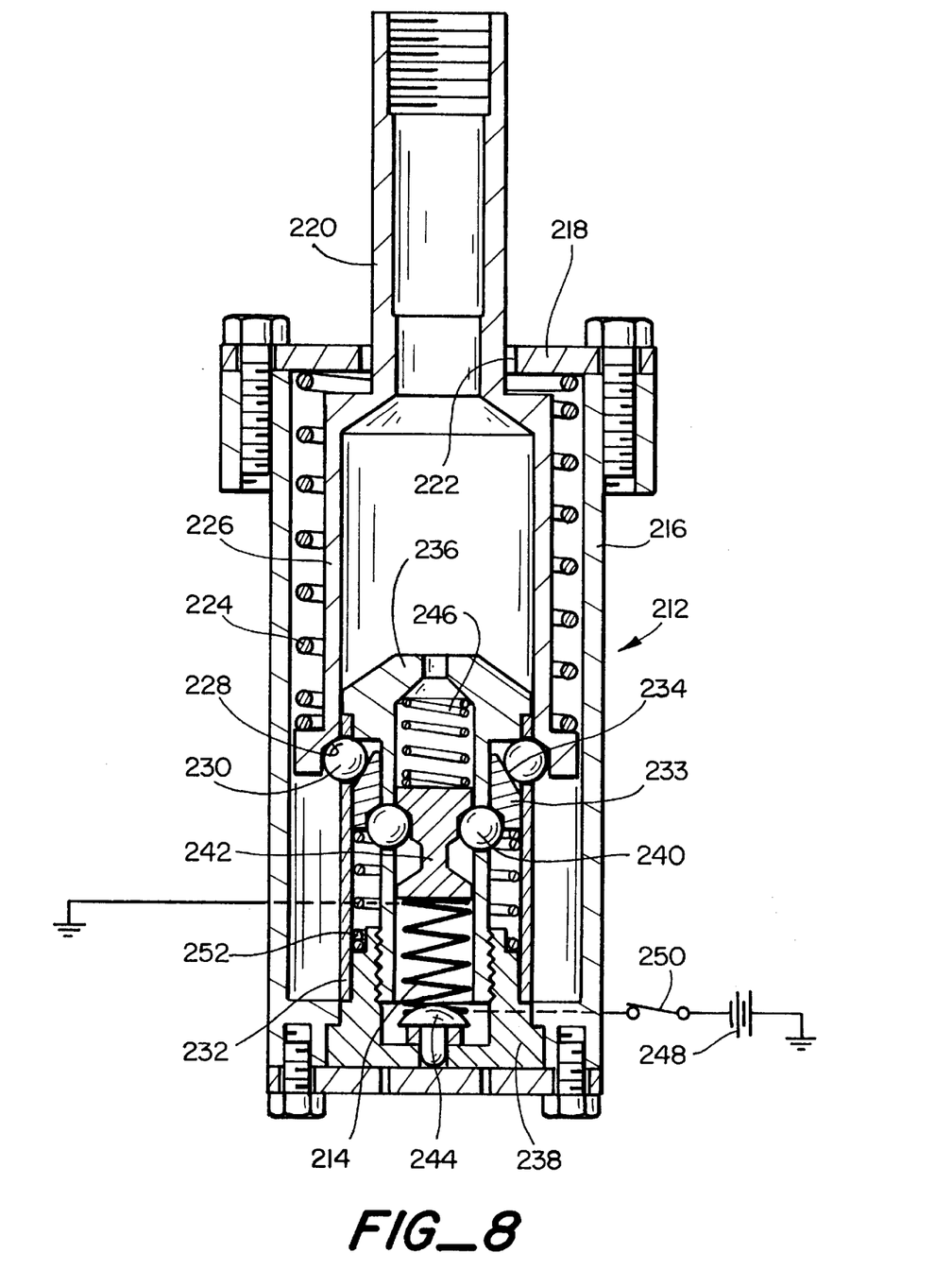
FIG. 8 is an axial section view of a release device according to a further embodiment.

FIG. 8 illustrates another embodiment providing a release device 212 which is specially adapted for applications where a relatively longer stroke of an SMA actuating element is desired. Such a longer stroke is achieved by forming the SMA wire into a coil 214 so that a long length of the wire is contained in a relatively small space. The SMA coil's recovery to its memory shape is by shear and torsion. When heated through its shape-change transition temperature, SMA coil 214 elongates through a relatively large stroke, but this results in the coil applying relatively less axial compressive force as compared to contraction of such a wire in tension. Release device 212 accommodates this reduction in available SMA actuating force by reducing the force required to trigger the release mechanism in the manner described below.

Release device 212 is further comprised of a cylindrical housing 216 which is mounted to the associated structure 218, such as the spacecraft frame. A retaining element 220 is mounted for axial sliding movement within the housing with the upper end of the element penetrating through an opening 222 in structure for engaging the structure, not shown, which is to be released, such as the spacecraft payload. Retaining element 220 is moved from its locked position, shown in FIG. 8, downwardly to its released position by means of a high force main drive spring 224 which is mounted about a collar 226 formed on the end of the retaining element. A component of the force from the drive spring is applied by means of a camming surface 228 formed on the collar against primary ball detents 230 which fit in holes formed on opposite sides of an outer ball keeper 232.

Primary ball detents 230 are held in their captured positions shown in FIG. 8 by means of an annular secondary latch 232 having an upper annular beveled surface 234 which holds the balls in place. The secondary latch is mounted for axial sliding movement about a tubular reset spring housing 236, the lower end of which is threadably mounted into an end cap 238 of the housing. The secondary latch is held in its armed position, shown in FIG. 8, by means of a pair of primary ball detents 240 which are loosely fitted within openings formed on opposite sides of the reset spring housing. The primary ball detents in turn are held in their captured positions, shown in FIG. 8, by means of a spool-shaped primary latch 242 which is mounted for axial sliding movement within a cylindrical bore of the reset spring housing. The SMA coil extends from the lower end of the primary latch downwardly and rests on the head of an electrical contact 244 which in turn is mounted in the housing end cap. The primary latch is moved to its armed position, shown in FIG. 8, upwardly toward its triggered position when the SMA coil is heated through its phase-change transition temperature so as to exert an upward force as the coil elongates. Upward movement of the primary latch compresses a primary latch reset spring 246 which is mounted above the upper end of the primary latch. The SMA coil is heated by a suitable power source, shown schematically as the battery 248 and on-off switch 250.

The concatenation of the primary and secondary ball detents and latches acting in series steps down force components from the drive spring which act on the balls when in their captured positions. This means that the resulting force acting on the primary ball detents 240 is relatively small such that the frictional force between these detents and the primary latch is sufficiently small to be overcome by the relatively weak force developed when the SMA coil extends to its memory shape. As primary latch 242 moves to its triggered position the primary ball detents are pushed inwardly into the annular recess of the primary latch. This enables downward movement of secondary latch 232 due to the downward component of force applied by the secondary ball detents. As the secondary latch moves down, the secondary ball detents are pushed inwardly into their retracted positions, thereby enabling the drive spring to move the retaining element to its released position.

After the electric circuit is opened and the SMA coil cools below its transition temperature, the retaining element can be pushed back by suitable means to its locked position. A secondary reset spring 252 is then enabled to push the secondary latch upwardly to its armed position which in turn pushes the secondary ball detents outwardly to their captured positions. This movement of the secondary latch enables primary reset spring 246 to push the primary latch downwardly which in turn pushes the secondary balls outwardly into their captured positions. Downward movement of the primary latch also plastically deforms the SMA coil back to its low temperature shape. This resetting of all of the internal components of the release device is automatic after the retaining element is returned to its locked position.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A release mechanism for use in a device which moves a latch in a direction to activate an energy source with the activated energy source releasing a retaining element from engagement with a structure, the release mechanism comprising the combination of an elongate actuating element comprising a head portion having an end carried by the structure and a tail portion having an end carried for movement with the latch, said actuating element being comprised of a shape memory alloy material which has a phase-change transition temperature, said head portion extending along a first path which is constrained from angular displacement relative to the structure, said head portion being free to elongate and contract along the first path, said tail portion extending along a second path which is free to angularly displace relative to the structure and latch; means for heating the actuating element through said phase-change transition temperature for recovery of the actuating element by contraction from a low temperature shape to a memory shape, said tail portion being positioned so that the second path makes an acute angle with respect to said direction of movement of the latch, said contraction resulting in an effective contraction stroke of the actuating element being concentrated in the tail portion with the contraction stroke moving the latch to a position which activates the energy source responsive to said recovery of the actuating element to its memory shape.

2. A release mechanism as in claim 1 in which said acute angle is in the range of 10° to 65°.

3. A release mechanism as in claim 1 in which said actuating element extends in a loop comprising said first mentioned head portion and said first mentioned tail portion, said first mentioned head portion and said first mentioned tail portion being positioned on one side of the latch, said loop further comprising a second head portion and a second tail portion, said second head portion and second tail portion being positioned on a side of the latch which is opposite said first side, said second head portion and second tail portion being comprised of a shape memory alloy material which has a phase-change transition temperature, said second head portion being free to elongate and contract along a third path, and said second tail portion extending along a fourth path which is free to angularly displace relative to the structure and latch.

4. A release device for disengaging a retaining element from a structure, the release device comprising the combination of a housing; means for guiding said retaining element for movement along a path relative to the housing between locked and released positions at which the retaining element is respectively engaged with and disengaged from the structure; drive force means for applying a yieldable drive force for urging the retaining element toward the released position; a retractable detent mounted for movement between a captured position in which the retaining element is held by the detent in said locked position and a retracted position in which the drive force is enabled to urge the retaining element toward the released position; a latch mounted for movement relative to the housing between an armed position and a triggered position, said latch in its armed position resisting said component of the drive force for holding the detent in the captured position, and said latch in its triggered position enabling said component of the drive force to urge the detent toward the triggered position; an actuating element comprised of a shape memory alloy material which recovers from a low temperature shape to a memory shape when heated through a phase-change transition temperature; and connecting means for operably connecting the actuating element with the latch for moving the latch toward its triggered position responsive to said recovery of the actuating element to its memory shape.

5. A release device as in claim 4 in which said detent comprises at least one ball; and a ball keeper for releasably holding the ball in said captured position.

6. A release device as in claim 4 in which said movement of the latch is through a stroke displacement from the armed to the triggered positions; said actuating element is elongate and recovers by contraction to its memory shape through a contraction distance; and said connecting means comprises stroke multiplication means for causing the stroke displacement of the latch to be a predetermined multiple of said contraction distance.

7. A release device as in claim 6 in which said actuating element comprises a tail portion which is carried for movement with the latch; and said stroke multiplication means comprises means for positioning the tail portion to extend in a direction which makes an acute angle with respect to said movement of the latch toward its armed position.

8. A release device as in claim 7 in which said acute angle is in the range of 10° to 65°.

9. A release device as in claim 7 in which said actuating element further comprises a head portion which is between the tail portion and the housing whereby the contraction distance is the sum of contraction of the distances of the head and tail portions responsive to the actuating element being heated through its phase-change transition temperature.

10. A release mechanism as in claim 9 in which said actuating element extends in a loop comprising said first mentioned head portion and said first mentioned tail portion, said first mentioned head portion and said first mentioned tail portion being positioned on one side of the latch, said loop further comprising a second head portion and a second tail portion, said second head portion and second tail portion being positioned on a side of the latch which is opposite said first side, said second head portion and second tail portion being comprised of a shape memory alloy material which has a phase-change transition temperature, said second head portion being free to elongate and contract along a third path, and said second tail portion extending along a fourth path which is free to angularly displace relative to the housing and latch.

* * * * *